United States Patent [19]
Farrington et al.

[11] Patent Number: 6,038,148
[45] Date of Patent: *Mar. 14, 2000

[54] SELF-DRIVEN SYNCHRONOUS RECTIFICATION SCHEME

[75] Inventors: Richard W. Farrington, Heath; Jun Zhang, Garland; William Hart, Plano, all of Tex.

[73] Assignee: Ericsson, Inc., Richardson, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 09/209,733

[22] Filed: Dec. 11, 1998

[51] Int. Cl.[7] ............................ H02M 3/335; H02M 7/00
[52] U.S. Cl. .............................................. 363/21; 363/127
[58] Field of Search ................................. 363/16, 20, 21, 363/95, 97, 125, 127

[56] References Cited

U.S. PATENT DOCUMENTS

| | | | |
|---|---|---|---|
| 5,274,543 | 12/1993 | Loftus, Jr. ................................. | 363/127 |
| 5,590,032 | 12/1996 | Bowman et al. .......................... | 363/15 |
| 5,625,541 | 4/1997 | Rozman ..................................... | 363/21 |
| 5,663,877 | 9/1997 | Dittli et al. ............................... | 363/127 |
| 5,781,420 | 7/1998 | Xia et al. .................................. | 363/21 |
| 5,870,299 | 2/1999 | Rozman ..................................... | 363/127 |

OTHER PUBLICATIONS

Tabisz, W., Lee, F.C., Chen, D., "A MOSFET Resonant Synchronous Rectifier for High Frequency DC/DC Converters", IEEE PESC Aug. 1990 Proceedings, pp.769–779.

Jitaru, I.D., "Constant Frequency, Forward Converter with Resonant Transitions", Jun. HFPC 91 Proceedings, pp. 282–292.

Cobos, J.A., et al., "Several Alternatives for Low Output Voltage on Board Converters", IEEE APEC Sep. 98 Proceedings, pp. 163–169.

Murakami, N., et al., "A Highly Efficient, Low–profile 300 W Power Pack for Telecommunications Systems", IEEE APEC May 1994 Proceedings,pp. 786–792.

Yamashita, N, Murakami, N., and Yachi, T., "A Compact, Highly Efficient 50 W on Board Power Supply Module for Telecommunications Systems", IEEE APEC Dec. 1995 Proceedings, pp. 297–302.

Djekic, O., Brkovic, M., " Synchronous Rectifier vs. Shottky Diodes in a Buck Topology for Low Voltage Applications", IEEE PESC May 1997 Proceedings, pp. 1374–1380.

Nakayashi, Y., Shimamori, H., Satoh, T., Ohno, T. "High–Efficiency Switching Power Supply Unit with Synchronous Rectifier", IEEE Mar. 1998, pp. 398–403.

*Primary Examiner*—Matthew Nguyen
*Attorney, Agent, or Firm*—Jackson Walker, LLP

[57] ABSTRACT

A self-driven synchronous rectifier circuit (42) for a power converter. The circuit comprises a transformer (49, 70) having a secondary winding with a first and second terminal, a first synchronous rectifier (14) coupled to the second transformer terminal and having a control terminal, and a second synchronous rectifier (16) coupled to the first transformer terminal and having a control terminal. The circuit (42) also comprises a first switch (44) coupled to the first synchronous rectifier (14) control terminal, and a second switch (46) coupled to the second synchronous rectifier (16) control terminal. The first (44) and second switch (46) are also coupled to the secondary winding. Switching transitions of the first (14) and second (16) synchronous rectifiers are initiated by a polarity reversal of the voltage of the secondary transformer winding.

29 Claims, 8 Drawing Sheets

SELF-DRIVEN SYNCHRONOUS RECTIFICATION SCHEME

TECHNICAL FIELD

This invention relates generally to logic integrated circuits, and more particularly to a novel self-driven synchronous rectification scheme for a power converter, easily adapted to all types of circuit topologies.

BACKGROUND OF THE INVENTION

As logic integrated circuits (IC's) have migrated to lower working voltages in the search for higher operating frequencies, and as overall system sizes have continued to decrease, power supply designs with smaller and higher efficiency power modules are in demand. In an effort to improve efficiencies and increase power densities, synchronous rectification has become necessary for these type of applications. Synchronous rectification refers to using active devices such as the MOSFET as a replacement for Schottky diodes as rectifier elements in circuits. Recently, self-driven synchronous schemes have been widely adopted in the industry as the desired method for driving the synchronous rectifiers in DC/DC modules for output voltages of 5 volts and below. Self-driven synchronous schemes provide an easy, cost effective and reliable method of implementing synchronous rectification.

Most of these schemes are designed to be used with a very particular set of topologies commonly known as "D, 1-D" (complementary driven) type topologies. See Cobos, J. A., et al., "Several alternatives for low output voltage on board converters", IEEE APEC 98 Proceedings, at pp. 163–169. See also U.S. Pat. No. 5,590,032 issued on Dec. 31, 1996 to Bowman et al. for a Self-synchronized Drive Circuit for a Synchronous Rectifier in a Clamped-Mode Power Converter, and U.S. Pat. No. 5,274,543 issued on Dec. 28, 1993 to Loftus entitled Zero-voltage Switching Power Converter with Lossless Synchronous Rectifier Gate Drive. In these types of converters, the power transformer signal in the secondary winding has the correct shape and timing to directly drive the synchronous rectifiers with minimum modifications. FIG. 1A shows an example of this family of converters, with an active clamp forward 10 and self-driven synchronous rectification provided by synchronous rectification circuitry 12 comprising two synchronous rectifiers 14 and 16 coupled between the secondary winding of the transformer 18 and the output. The transformer signal 20 for these types of converters has a square shape with two very recognizable intervals, each corresponding to the "on" time of one of the synchronous rectifiers 14 and 16, as shown in FIG. 1B.

In topologies such as the hard-switched half-bridge (HB), the full-bridge (FB) rectifiers, and the push-pull topologies and non-"D, 1-D" type topologies (e.g. clamp forward with passive reset), the transformer voltage has a recognizable zero voltage interval, making it undesirable to implement self-driven synchronous rectification. As a result, it is necessary to use an external drive circuit with these circuit topologies. Using the transformer voltage to drive the synchronous rectifiers results in conduction of the parasitic anti-parallel diode of the MOSFETs used for synchronous rectifiers 14 and 16 for a significant portion of the freewheeling interval, negatively affecting the efficiency of the module, which is undesired. Some self-driven implementations for the resonant reset forward have been reported. See Murakami, N. et al., "A Highly Efficient, Low-profile 300 W Power Pack for Telecommunications Systems", IEEE APEC 1994 Proceedings, at pp. 786–792 and Yamashita, N. et al., "A Compact, Highly Efficient 50 W On Board Power Supply Module for Telecommunications Systems", IEEE APEC 1995 Proceedings, at pp. 297–302. In these implementations, the resonant reset interval has been adjusted to provide the correct gate-drive signal during the freewheeling interval.

SUMMARY OF THE INVENTION

The present invention achieves technical advantages as a self-driven synchronous rectification scheme that can be easily adapted to all type of topologies, including hard-switched HB, FB and push-pull converters, for which no efficient self-driven synchronous rectification scheme was previously available.

In one embodiment, disclosed is a self-driven synchronous rectifier circuit for a power converter. The circuit includes a transformer having a primary and secondary winding, the secondary winding having a first terminal and a second terminal. The circuit includes a first synchronous rectifier coupled to the second transformer terminal and having a control terminal, and a second synchronous rectifier coupled to the first transformer terminal and having a control terminal. A first switch is coupled to the first synchronous rectifier control terminal, and a second switch is coupled to the second synchronous rectifier control terminal. The first and second switches are coupled to the secondary winding, wherein switching transitions of the first and second synchronous rectifiers are initiated by a polarity reversal of the voltage of the secondary transformer winding.

In another embodiment, disclosed is a self-driven synchronous rectifier circuit for a power converter, the circuit including a transformer having a primary and secondary winding, the secondary winding having a first terminal and a second terminal. The circuit includes a first synchronous rectifier having a source, drain and gate, the drain of the first synchronous rectifier connected to the second terminal of the secondary winding, and a second synchronous rectifier having a source, drain and gate, the source of the second synchronous rectifier being coupled to the source of the first synchronous rectifier, and the drain of the second synchronous rectifier being coupled to the first terminal of the secondary winding. The circuit includes a first switch having a source, drain and gate, the drain of the first switch coupled to the gate of the first synchronous rectifier, and the source of the first switch coupled to the first terminal of the secondary winding. The gate of the first switch is coupled to the second terminal of the secondary winding. The circuit further includes a second switch having a source, drain and gate, where the source of the second switch is coupled to the second terminal of the secondary winding and the gate of the second switch is coupled to the first terminal of the secondary winding. The drain of the second switch is coupled to the gate of the second synchronous rectifier. The switching transitions of the first and second synchronous rectifiers are initiated by a polarity reversal of the voltage of the secondary transformer winding.

Also disclosed is a method of rectifying a varying voltage from a power converter using a self-driven synchronous rectifier circuit with a transformer having a primary winding and a secondary winding, where the secondary winding has a first and second terminal. The method includes the steps of providing the varying signal to the primary winding of the transformer, a first synchronous rectifier conducting current via a second terminal of the second winding and a first switch controlling the first synchronous rectifier. A second synchronous rectifier conducts current via the first terminal of the second winding, and a second switch controls the second synchronous rectifier, wherein switching transitions of the first and second synchronous rectifiers are initiated by a polarity reversal of the voltage of the secondary transformer winding.

BRIEF DESCRIPTION OF THE DRAWINGS

The above features of the present invention will be more clearly understood from consideration of the following descriptions in connection with accompanying drawings in which.

Corresponding numerals and symbols in the different figures refer to corresponding parts unless otherwise indicated.

DETAILED DESCRIPTION OF PREFERRED EMBODIMENTS

The following is a description of the structure and method of the present invention. A prior art circuit will be discussed first, followed by a description of several preferred embodiments and alternatives of the present invention, and a discussion of the advantages.

Figure 2A:
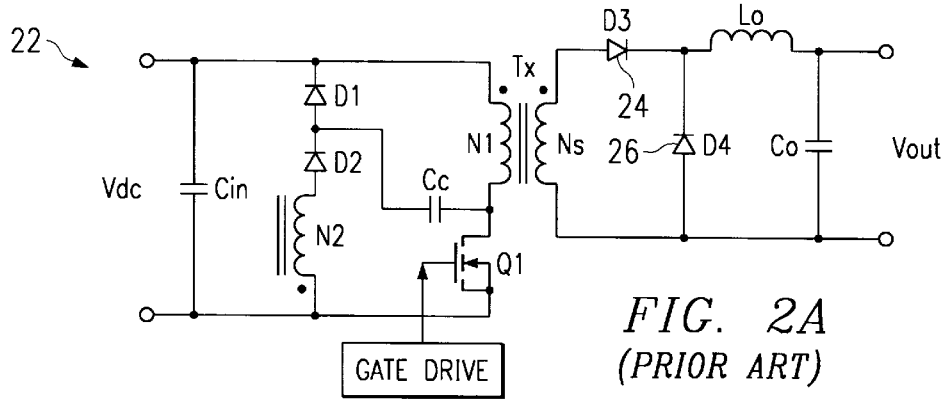
FIG. 2A illustrates a prior art clamp forward circuit with passive reset.
Figure 2B:
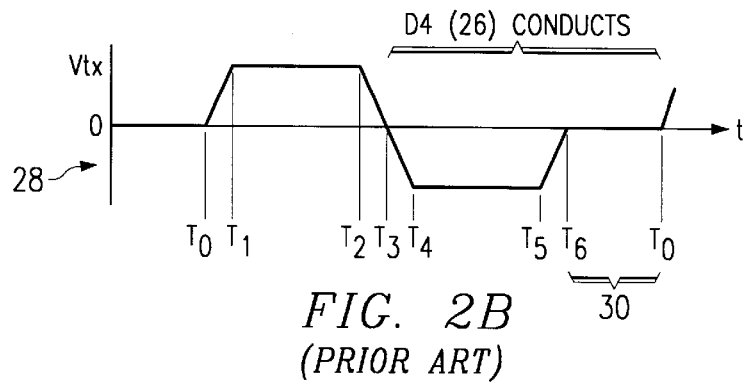
FIG. 2B shows secondary transformer voltage waveform 28 of FIG. 2A.

Referring to FIG. 2A, therein is illustrated a clamp forward circuit 22 with passive reset, with secondary transformer voltage waveform 28 shown in FIG. 2B. A problem with applying self-driven synchronous schemes of the prior art to this topology is that the synchronous rectifier used to replace rectifier 26 which conducts during the freewheeling stage turns off (corresponding to period 30 of waveform 28 in FIG. 2B) before the freewheeling stage ends. The parasitic anti-parallel diode of the synchronous rectifier MOSFET 26 conducts, increasing the losses. It is necessary for the MOSFET to remain on and conduct during the entire freewheeling stage to effectively implement a self-driven synchronous rectification for these types of converters, and to obtain high efficiency.

Figure 3A:
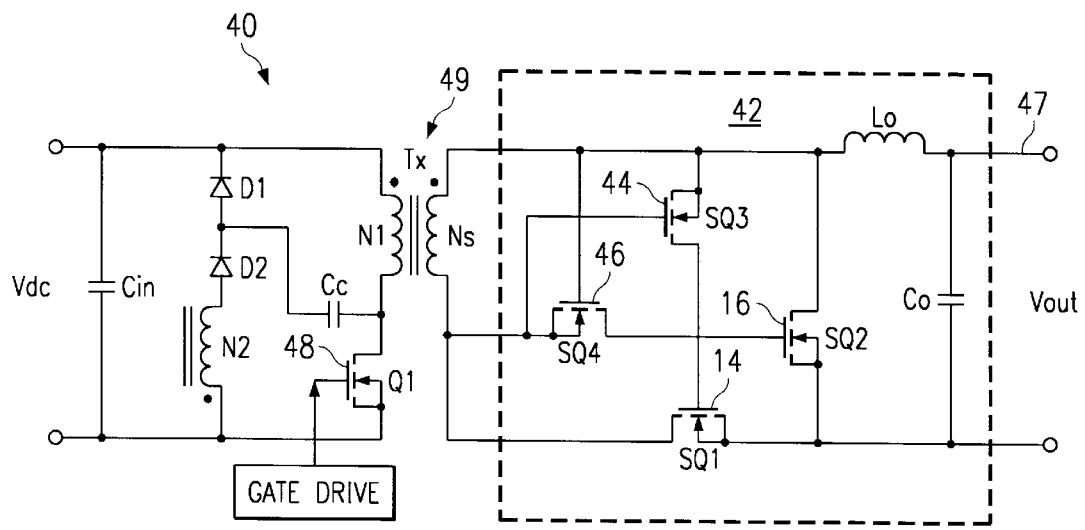
FIG. 3A illustrates a clamp forward circuit with passive reset utilizing an embodiment of the present invention.

The present invention solves this problem of the prior art by adding two switches 44 and 46, shown in the clamp forward with passive reset layout in FIG. 3A. Preferably, the switches 44 and 46 are MOSFETs smaller than the MOSFETs used as synchronous rectifiers 14 and 16. The switches 44 and 46 are used to drive synchronous rectifiers 14 and 16, respectively. In this driving scheme, the synchronous rectifiers 14 and 16 remain on and conduct when the transformer signal vanishes to zero, in contrast to the traditional self-driven scheme of the prior art. According to the present invention, synchronous rectifiers 14 and 16 are turned off when the transformer voltage switches polarity. Synchronous rectifiers 14 and 16 are turned on through the anti-parallel diode of the driving switches 44 and 46, and are turned off when the transformer voltage switches polarity through switches 44 and 46. Preferably, an inductor $L_0$ is coupled in series between the synchronous rectifier 16 and an output voltage terminal 47 to smooth current ripples, and a capacitor $C_0$ is coupled across the rails to smooth the voltage, as shown.

Figure 3B:
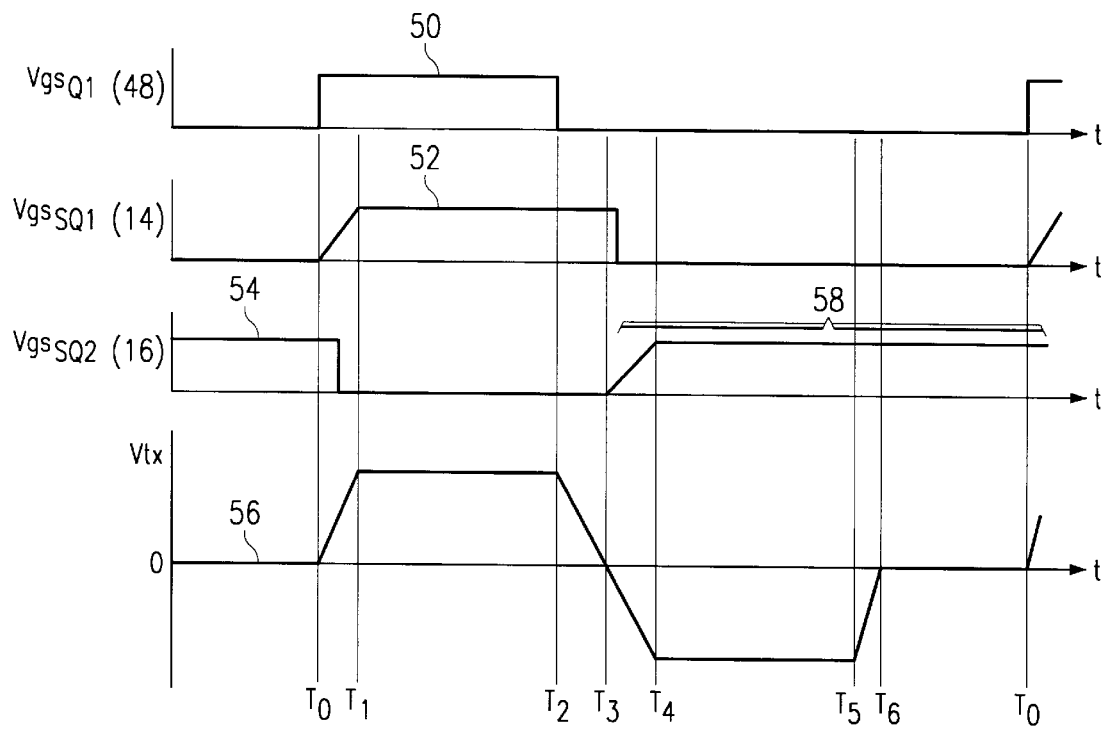
FIG. 3B shows voltage waveforms of the self-driven synchronous rectifier of the present invention for a clamp forward circuit with passive reset of FIG. 3A.

At first glance, this self-driven synchronous rectifying scheme may seem to have a fundamental flaw. Referring to FIG. 3B, at time $T<t_0$ rectifier 14 is off and rectifier 16 is conducting. At time $T=t_0$ the primary switch 48 turns on and tries to initiate a new switching cycle. Assuming an ideal transformer 49 (no leakage inductance and no series resistance) and the absence of all parasitics in the secondary circuit, the primary switch 48 turns on into a short circuit. The sequence is as follows: at the time when the primary switch 48 turns on, the anti-parallel diode of rectifier 14 instantaneously tries to conduct with rectifier 16 still on, resulting in a short formed across the secondary winding of the transformer 49. Rectifier 16 needs the voltage of the transformer 49 to reverse polarity in order to turn off, but this voltage cannot reverse before rectifier 16 turns off. However, this concept assumes ideal components and circuit layout. Therefore, if stray inductances and resistances are incorporated into the discussion it can be easily shown (experimentally and by simulation) that at switching frequencies of several kilohertz, the stray inductances and resistances found on a typical converter layout allow enough voltage to develop in the secondary to turn off rectifier 16. Rectifier 14 turns on into a momentary "short circuit".

The driving scheme of the present invention results in "shoot through" currents (peak currents due to a short circuit) during switching transitions, which may be compensated for, as will be described herein. For the current levels and switching frequencies most board-mounted power modules are designed for, these shoot through currents are not severe. The shoot through currents result from turning on the synchronous rectifiers 14 and 16 "late", and are less severe than the shoot through currents developed due to the reverse recovery effect intrinsic to all synchronous rectifiers when their parasitic anti-parallel diode is allowed to conduct, as is the case in traditional self-driven synchronous schemes.

Figure 4:
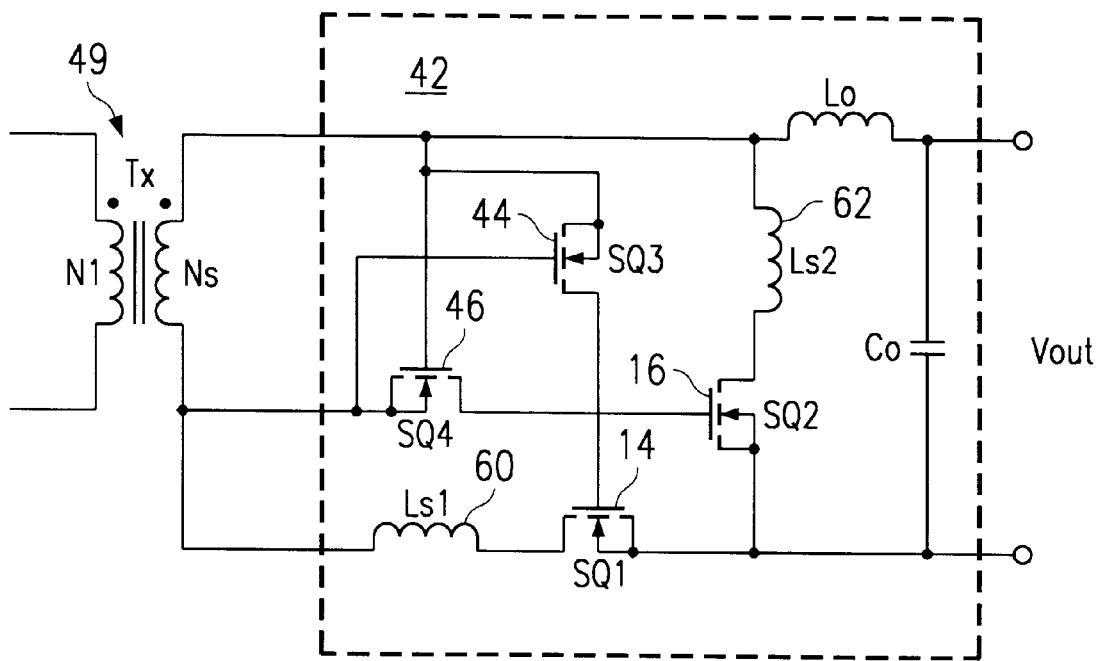
FIG. 4 shows a half-wave rectifier with the present invention and optional external inductors.

However, if shoot through currents interfere with the normal operation of the circuit, optional external inductor 60 and/or 62 may be added in series with synchronous rectifiers 14 and 16, respectively, as shown in FIG. 4. These external inductors 60 and 62 are preferably one-turn ferrite inductors that are allowed to saturate, or a more typical saturable inductor having square loop material. Using a saturable inductor minimizes the effect of the inductor on the overall performance of the circuit while eliminating shoot through currents.

Figure 5:
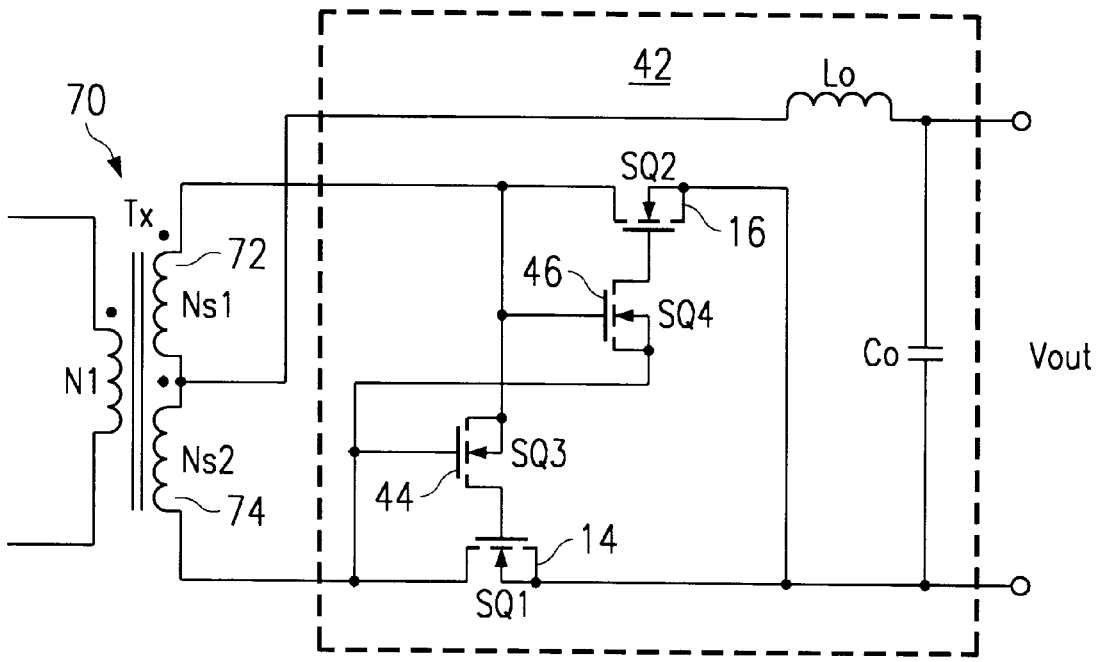
FIG. 5 illustrates the present invention configured for a full-wave rectifier.

The implementation of the present invention for use with a full-wave rectifier is similar to that of the half-wave rectifier and is shown in FIG. 5.

Figure 1A:
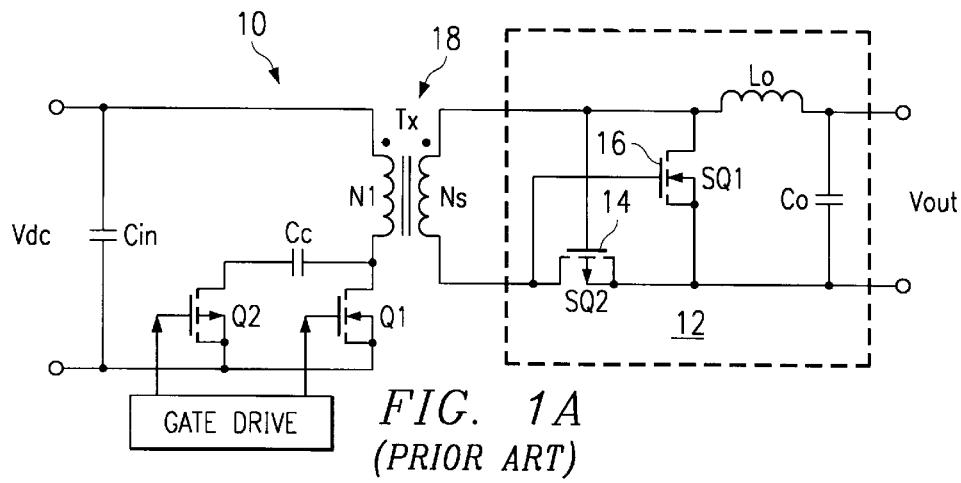
FIG. 1A illustrates a prior art active clamp forward converter with self-driven synchronous rectification.
Figure 1B:
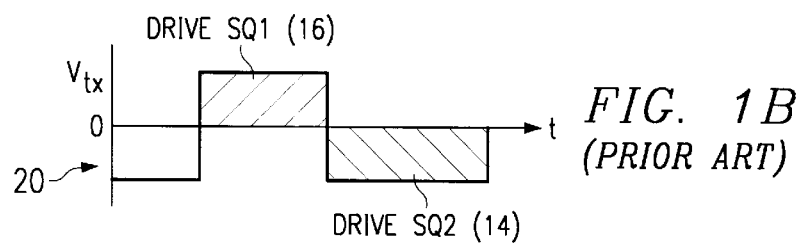
FIG. 1B illustrates typical transformer voltages for a "D, 1-D" type converter shown in FIG. 1A.
Figure 6:
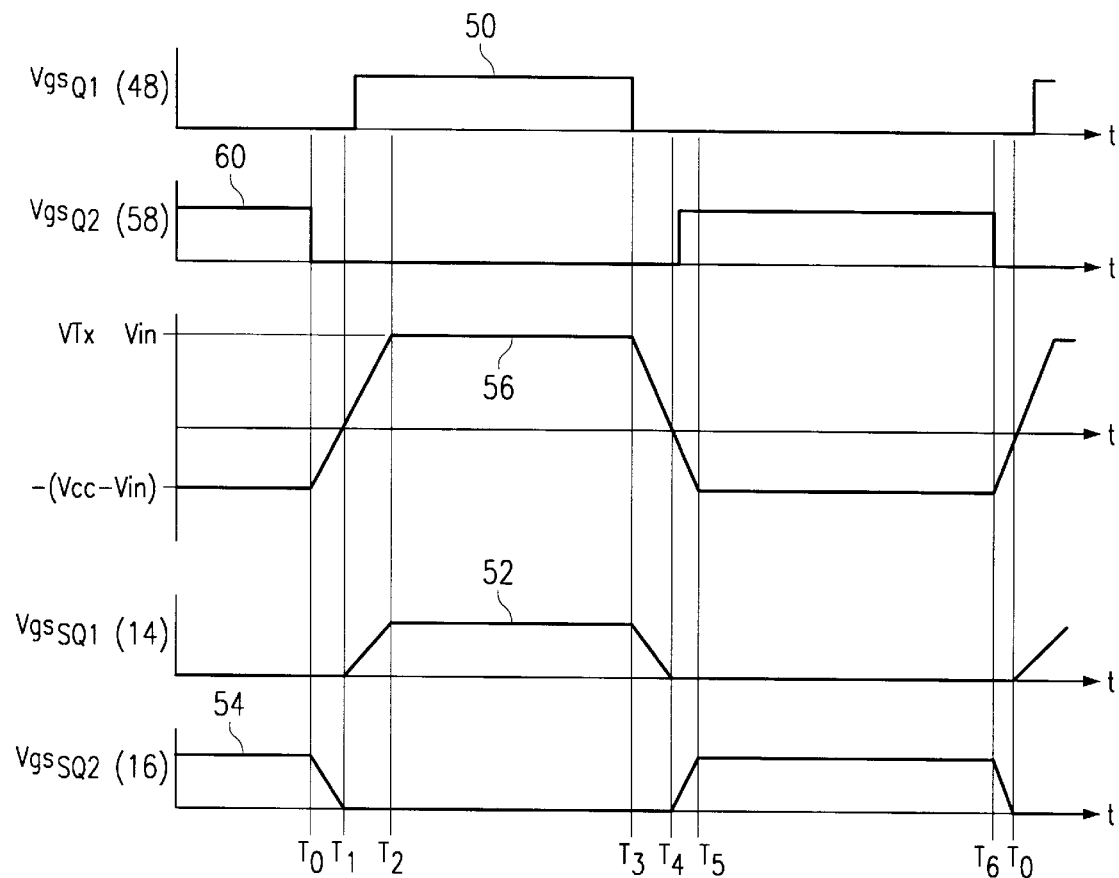
FIG. 6 shows typical waveforms of an active clamp forward converter with selfdriving schemes of the prior art.

In conventional self-driven synchronous rectifier schemes such as in FIG. 1, the synchronous rectifiers 14 and 16 turn off when the transformer voltage vanishes to zero and therefore the anti-parallel diodes of the MOSFETs conduct during the commutation stages 76 and 78, as shown in FIG. 6. The parasitic anti-parallel diodes of the MOSFETs used for synchronous rectifiers 14 and 16 are very slow and don't turn off fast enough in this type of application and shoot through currents are generated. These currents can be very severe, particularly at full load, compromising the performance of the module. It is recognized that one of the effects that prevents synchronous rectification from being used at higher switching frequencies (>500 kHz) is the loss resulting from reverse recovery in the synchronous rectifiers 14 and 16. The self-driven scheme of the present invention solves the reverse recovery problems, as previously discussed.

An additional advantage of the present synchronous self-driven scheme is that the additional switches 44 and 46 that were added to turn off the synchronous rectifiers act as an active damper to the gate drive signal. The switches 44 and 46 provide a buffer to the gate signal of the synchronous rectifiers 14 and 16 from the parasitic oscillations that normally appear in the secondary transformer winding due to the interactions of stray inductances and the output capacitance of the semiconductor devices. Traditional self-driven schemes of the prior art usually add additional components to minimize this effect.

Figure 7:
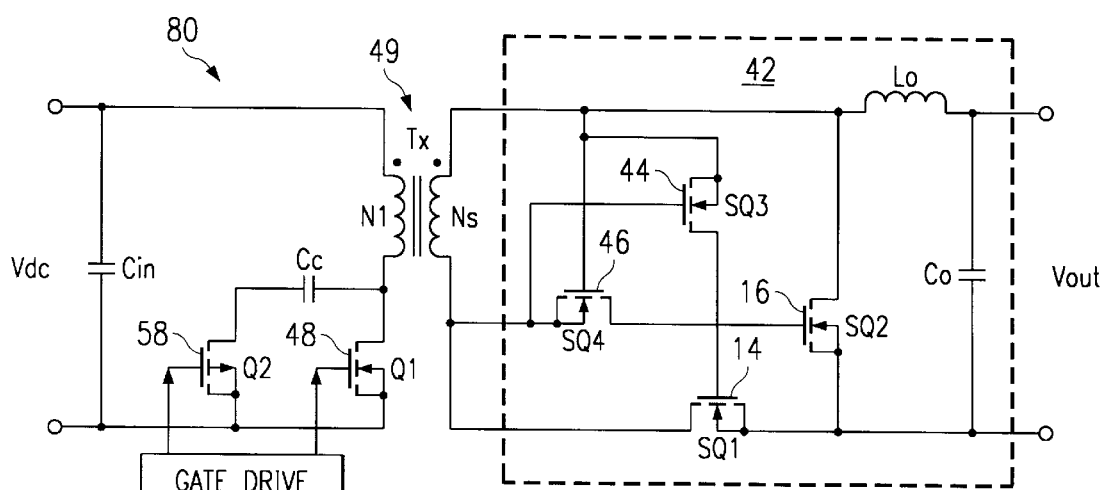
FIG. 7 illustrates an active clamp forward circuit with the self-driven synchronous rectification scheme of the present invention.
Figure 8:
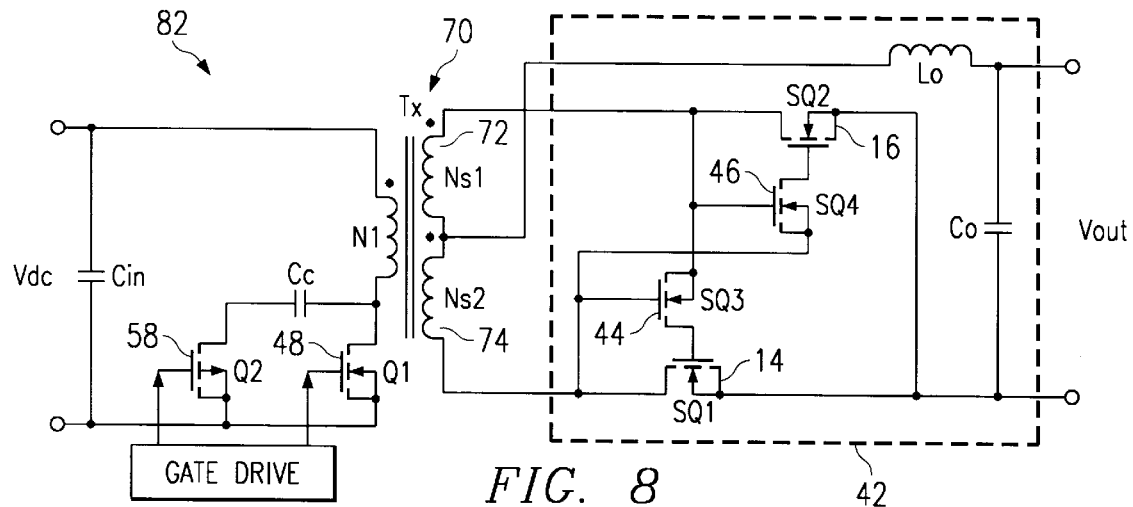
FIG. 8 shows an active clamp forward-flyback circuit with the self-driven scheme of the present invention.
Figure 9:
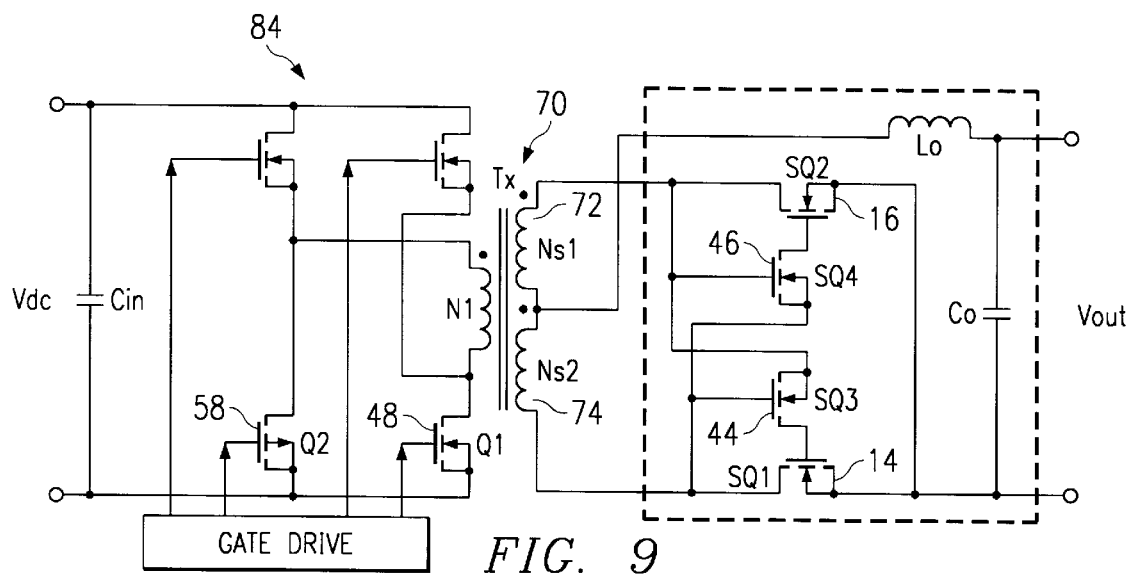
FIG. 9 illustrates a phase-shifted ZVS full-bridge circuit with the self-driven synchronous rectification scheme of the present invention.

FIGS. 7 and 8 show the implementation of the self-driven synchronous rectifier 42 of the present invention with an active clamp forward converter 80 and an active clamp forward-flyback converter 82, respectively. FIG. 9 shows the implementation of the self-driven synchronous rectifier 42 of the present invention with a phase-shifted Zero Voltage Switching (ZVS) full-bridge 84.

Figure 10:
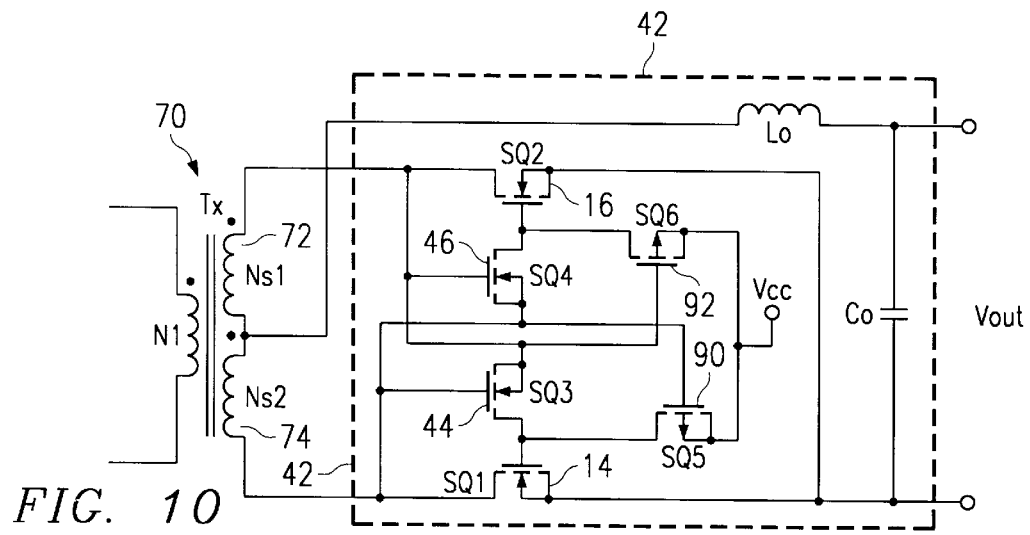
FIG. 10 shows an embodiment of the present self-driven synchronous scheme for a full-wave rectifier for use with a hard switched half-bridge, full-bridge, or push-pull type converter.
Figure 11:
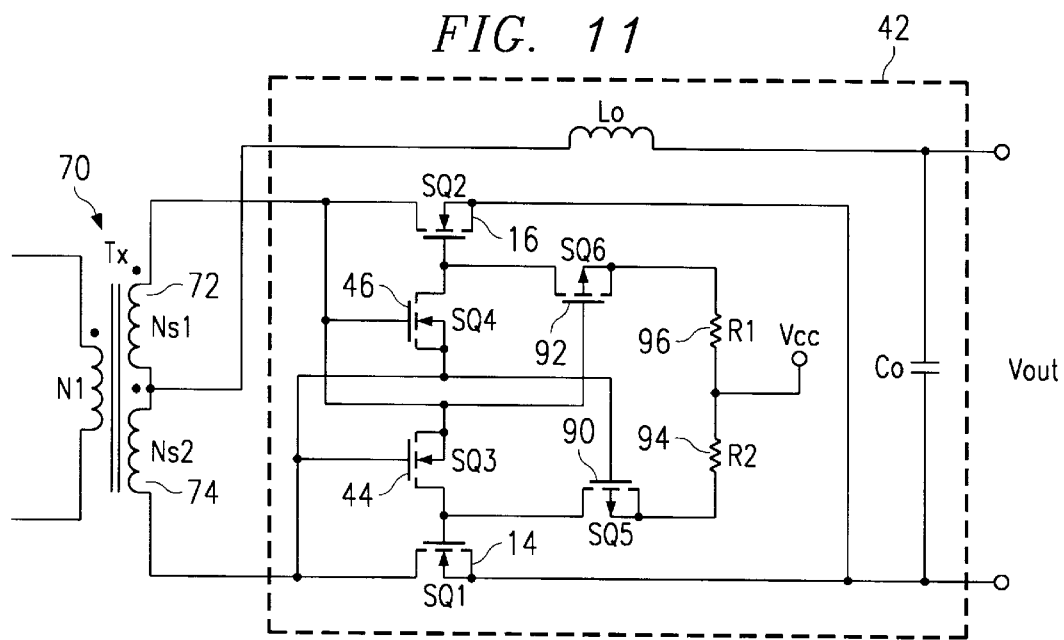
FIG. 11 illustrates an embodiment of the present self-driven synchronous rectification scheme for a full-wave rectifier with gate-drive current-limiting resistors 94 and 96.

The present invention works well with a variety of many circuit topologies. However, the concept cannot be directly applied to hard switched half-bridge, full-bridge, and push-pull topologies without some additional modifications, because the load current flows through both synchronous rectifiers 14 and 16 during the freewheeling stage, which is not the case for any of the topologies that were previously discussed. FIG. 10 shows the implementation of the present invention for a full-wave rectifier in a push-pull type topology. In this implementation, two additional switches 90 and 92 are added. Switches 90 and 92 preferably comprise P-type MOSFETs, and turn on the synchronous rectifiers 14 and 16 during the freewheeling stage. If shoot-through currents in the gate drive of 90 and 92 are a concern, resistors 94 and 96 may be placed in series with switches 90 and 92, respectively, to minimize the shoot through currents, as shown in FIG. 11.

Figure 12:
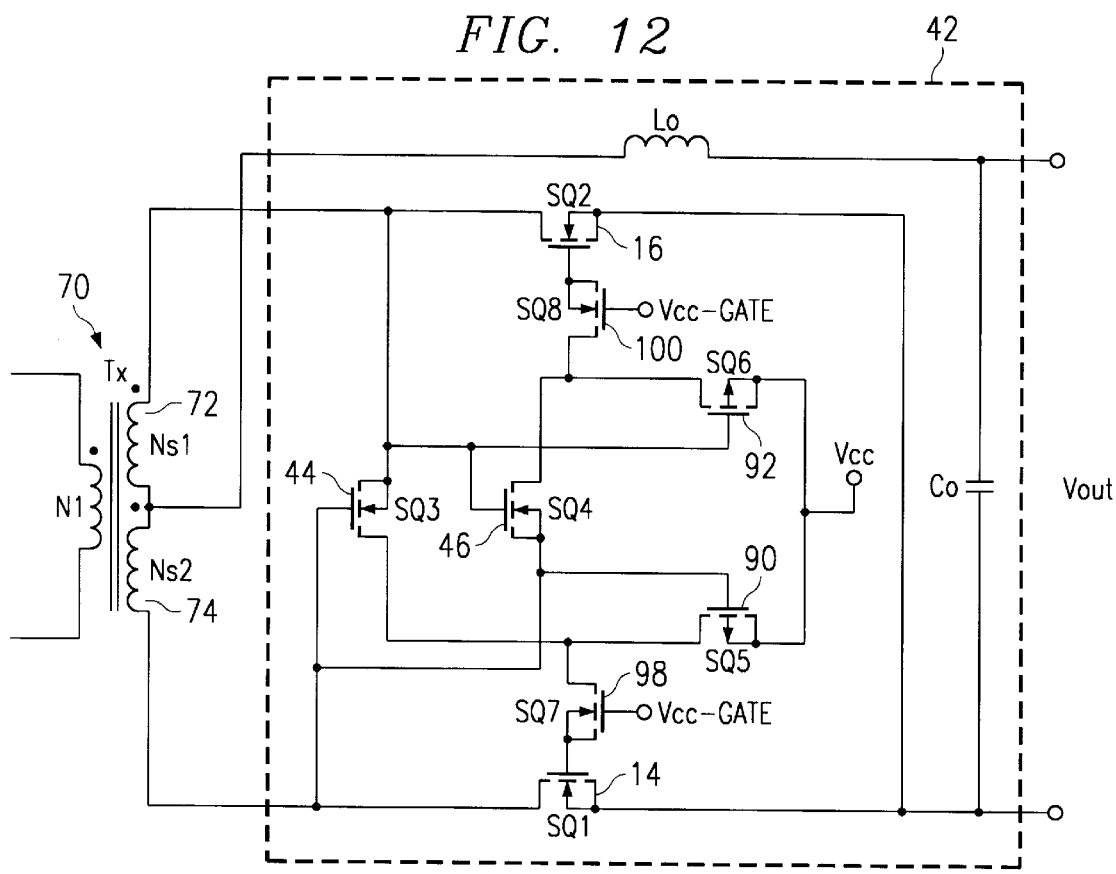
FIG. 12 shows an embodiment of the present self-driven synchronous full-wave rectifier having optional gate voltage limiters 90 and 92.

In most practical applications, it is necessary to clamp the gate-drive signal to a predetermined value in order not to exceed the breakdown voltage of the gate. This embodiment of the present invention is shown in FIG. 12. In this implementation, a pair of voltage limiters 98 and 100 preferably comprising N-type MOSFETs have been added to limit the voltage on the gate of the synchronous rectifiers to VCC-gate minus the threshold voltage (1 to 2 volts).

Figure 13:
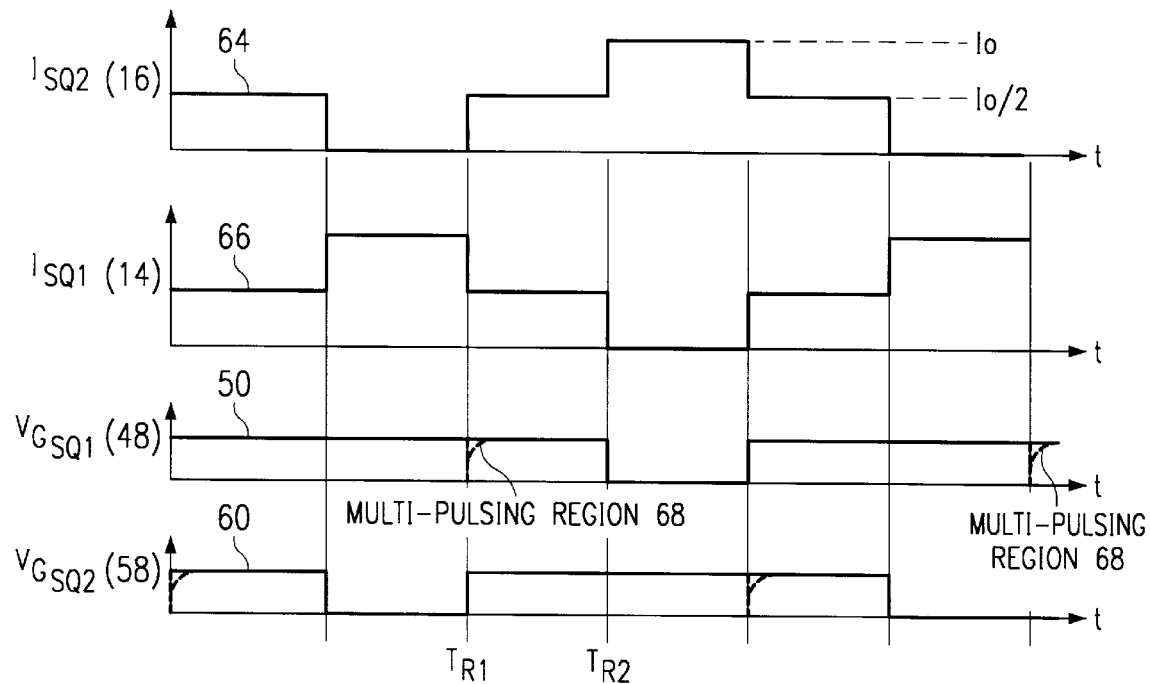
FIG. 13 shows synchronous rectifier current waveforms for hard-switched pushpull type topologies.
Figure 14:
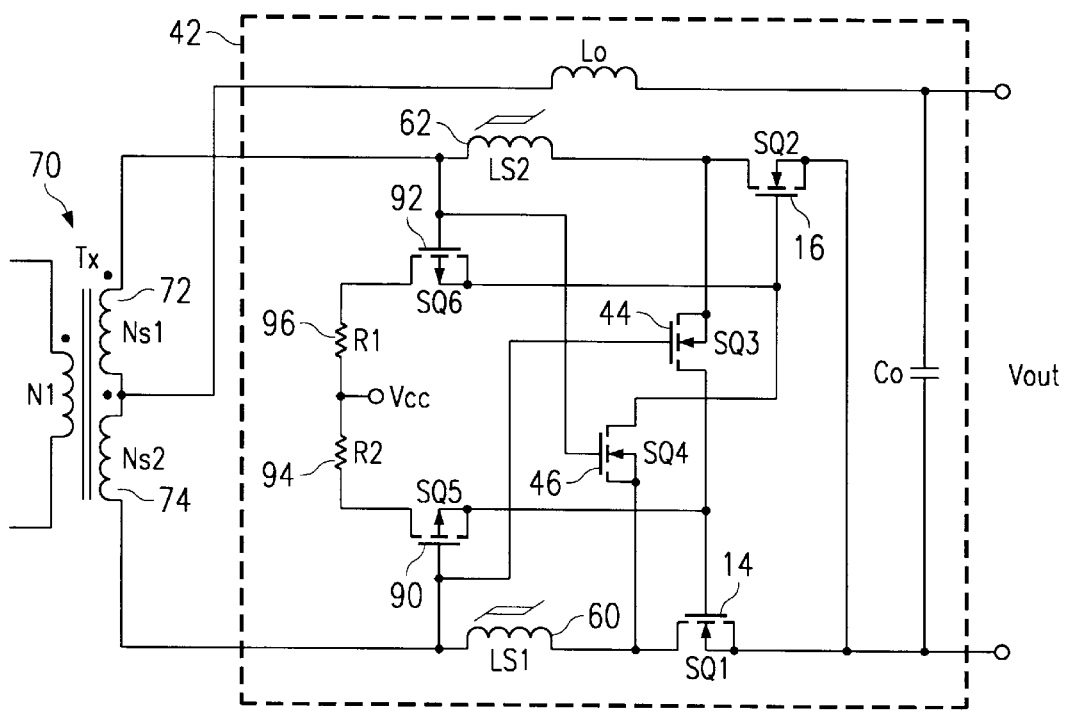
FIG. 14 shows an embodiment of the present invention with saturable inductors 60 and 62 added to reduce double pulsing.
Figure 15:
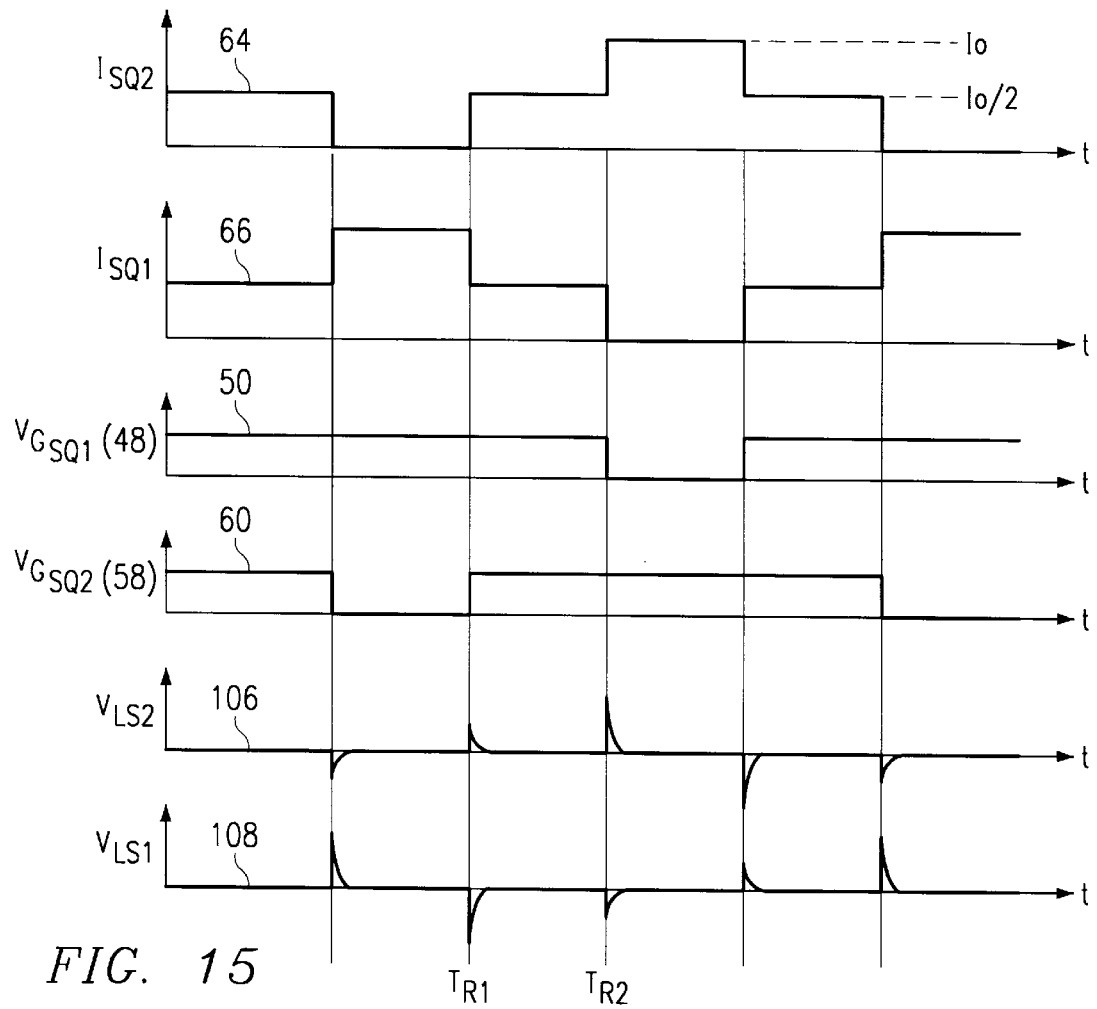
FIG. 15 illustrates typical waveforms for the present invention having saturable inductors.
Figure 16:
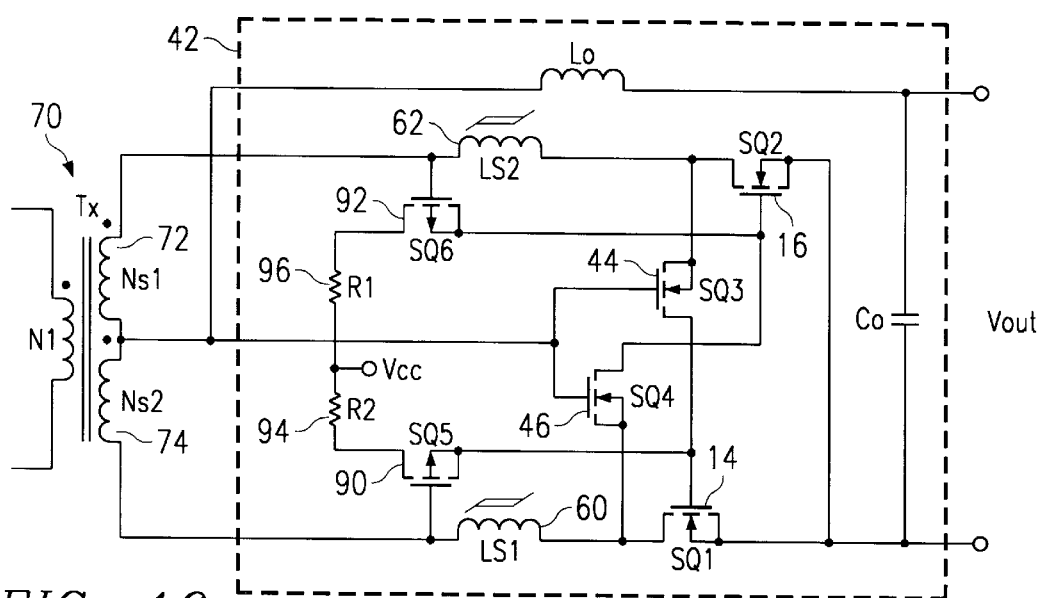
FIG. 16 shows an alternate embodiment, with different transformer connection for switches 44 and 46.

Implementing this self-driven scheme for the hard switched half-bridge, full-bridge, and push-pull topologies may result in multiple pulsing by the gate-drive. To understand this phenomena, next, the current 66 and 64, respectively, through the synchronous rectifiers 14 and 16 in these topologies is discussed, and is shown in FIG. 13. Transitions $T_{R1}$ and $T_{R2}$ develop voltages in the parasitic inductances and resistances with the same polarity. The voltage that develops across these parasitic inductances and resistances is what turns off switch 14 during transition $T_{R2}$. Therefore, the same phenomena tries to turn off switch 14 during transition $T_{R1}$, resulting in multi-pulsing of the gate-drive signal. To minimize multi-pulsing, saturable inductors 60 and 62 may be added in series with synchronous rectifiers 14 and 16, respectively, as shown in FIG. 14. If the saturable inductors 60 and 62 are assumed to have a square type material and their saturated inductance is assumed to dominate the operation of the secondary circuit, then the waveforms representing the operation of the self-driven synchronous rectifier are shown in FIG. 15. It can be shown that considerably more voltage is developed at the gate of switch 44 during transition $T_{R2}$ than during transition $T_{R1}$ as is desired. But as explained previously, at the switching frequencies and current levels of typical DC/DC modules, the stray inductances and resistances in the circuit layout are sufficient to generate enough voltage to start the switching transitions. Therefore, in addition to the saturable inductors 60 and 62, increased immunity into the gate signal of the drive switches is needed (FIG. 14). Scaling the drive voltage into the drive switches as shown in FIG. 16 results in additional immunity.

The novel method and system of the present self-driven synchronous rectifier scheme provides the advantage of efficiently providing self-driven synchronous rectification for a power converter, where the synchronous rectifier continues to conduct when the voltage across the transformer secondary winding is approximately zero. A further advantage of the present invention is the ability to adapt the scheme for any type of converter topology. Another advantage of the present invention is that the switches 44 and 46 act as an active damper to the gate drive signal, providing a buffer to the gate signal of the synchronous rectifiers 14 and 16 from parasitic oscillation, eliminating the need for additional components for minimizing this effect.

While the invention has been described with reference to illustrative embodiments, this description is not intended to be construed in a limiting sense. Various modifications in combinations of the illustrative embodiments, as well as other embodiments of the invention, will be apparent to persons skilled in the art upon reference to the description. The present invention has been described for use with a DC-DC power converter, but also derives technical advantages with other types of power converters such as AC-AC, for example. The synchronous rectifiers 14 and 16; switches 44, 46, 90, and 92; and voltage drivers 98 and 100 are shown as MOSFETs; however, it is contemplated that another type of FET or switching device would be suitable for use in the present invention. Also, throughout this disclosure, the gate-drive switches 44 and 46 are shown to be connected at the output terminals of the transformer (49, 70) secondary winding. However, switches 44 and 46 may be tapped from any place in the transformer winding with the purpose of scaling the driving voltages. For example, for very low voltage applications, it might be necessary to extend the secondary transformer windings in order to boost the driving signal. Furthermore, this concept can be easily extended to the current doubler rectifier circuit as well as resonant type converters. It is therefore intended that the appended claims encompass any such modifications or embodiments.

What is claimed is:

1. A self-driven synchronous rectifier circuit for a power converter, said circuit comprising:
    a transformer having a primary and secondary winding, said secondary winding having a first terminal and a second terminal;
    a first synchronous rectifier coupled to said second transformer terminal and having a control terminal;
    a second synchronous rectifier coupled to said first transformer terminal and having a control terminal;
    a first switch coupled to said first synchronous rectifier control terminal;
    a second switch coupled to said second synchronous rectifier control terminal; and said first and second switch being coupled to said secondary winding, wherein said first and second switches are connected to said first synchronous rectifier and said second synchronous rectifier, respectively, such that switching transitions of said first and second synchronous rectifiers are initiated by a polarity reversal of the voltage of said secondary transformer winding.

2. The circuit of claim 1 wherein:
    said first terminal is a first end of said secondary winding;
    said second terminal is a second end of said secondary winding;
    said first and second synchronous rectifiers comprise MOSFET's; and said control terminals of said synchronous rectifiers are gates.

3. The circuit of claim 2 wherein said first and second switches comprise MOSFETs having gates, wherein said gate of said first switch is connected to said second end of said secondary winding, and wherein said gate of said second switch is connected to said first end of said secondary winding.

4. The circuit of claim 1 further comprising a first inductor coupled in series with said first end of said secondary winding and an output voltage terminal, and a capacitor coupled in parallel with said output voltage terminal and a return voltage terminal.

5. The circuit of claim 4 further comprising:
    a second inductor coupled in series between said first end of said secondary winding and said second synchronous rectifier.

6. The circuit of claim 5 wherein said second inductor is coupled in series between said secondary winding and said first synchronous rectifier.

7. The circuit of claim 5 further comprising:
    a third inductor coupled in series between said secondary winding and said first synchronous rectifier.

8. The circuit of claim 7 wherein said second and third inductors are saturable inductors.

9. The circuit of claim 4 wherein said secondary winding comprises a center tap, wherein said first inductor is coupled in series with said center tap and said output voltage terminal, wherein said first terminal is a first end of said secondary winding and wherein said second terminal is a second end of said secondary winding, wherein said first and second switches comprise MOSFETs having gates, wherein said gate of said first switch is connected to said second end of said secondary winding, and wherein said gate of said second switch is connected to said first end of said secondary winding.

10. The circuit of claim 9 wherein said transformer is coupleable to a converter circuit of the type selected from the group consisting of: a full-wave rectifier, active clamp-forward fly-back; and phase-shifted ZVS full-bridge.

11. The circuit of claim 1 wherein said transformer is coupleable to a converter circuit of the type selected from the group consisting of: a clamp forward with passive reset; halfwave rectifier; and active clamp forward.

12. The circuit of claim 9 further comprising:
    a third switch coupled to said first synchronous rectifier, said second switch being coupled to said third switch; and
    a fourth switch coupled to said second synchronous rectifier, said first switch coupled to said fourth switch.

13. The circuit of claim 12 further comprising a first current-limiting resistor coupled between said third switch and a voltage source, and a second current-limiting resistor between said fourth switch and said voltage source.

14. The circuit of claim 12 wherein said transformer is coupleable to a converter circuit of the type selected from the group consisting of: a hard-switched half-bridge; full-bridge; and push-pull.

15. The circuit of claim 12 further comprising a first voltage limiter coupled to said first synchronous rectifier, a gate of said first voltage limiter coupled to a voltage source, and a second voltage limiter coupled to said second synchronous rectifier, a gate of said second voltage limiter coupled to a voltage source, wherein said first and second voltage limiters provide gate voltage limiting.

16. The circuit of claim 12 further comprising:
    a first inductor coupled in series with said first end of said secondary winding and an output voltage terminal;
    a capacitor coupled in parallel with said output voltage terminal and a return voltage terminal; and
    a second inductor coupled in series between said first end of said secondary winding and said second synchronous rectifier.

17. The circuit of claim 16 wherein said second inductor is coupled in series between said secondary winding and said first synchronous rectifier.

18. The circuit of claim 16 further comprising a third inductor coupled in series between said secondary winding and said first synchronous rectifier.

19. The circuit of claim 18 wherein said second and third inductors are saturable inductors.

20. A self-driven synchronous rectifier circuit for a power converter, said circuit comprising:
    a transformer having a primary and secondary winding, said secondary winding having a first terminal and a second terminal;
    a first synchronous rectifier having a source, drain and gate, said drain of said first synchronous rectifier connected to said second terminal of said secondary winding;
    a second synchronous rectifier having a source, drain and gate, said source of said second synchronous rectifier coupled to said source of said first synchronous rectifier, said drain of said second synchronous rectifier coupled to said first terminal of said secondary winding;

a first switch having a source, drain and gate, said drain of said first switch coupled to said gate of said first synchronous rectifier, said source of said first switch coupled to said first terminal of said secondary winding, said gate of said first switch coupled to said second terminal of said secondary winding; and a second switch having a source, drain and gate, said source of said second switch coupled to said second terminal of said secondary winding, said gate of said second switch coupled to said first terminal of said secondary winding, and said drain of said second switch coupled to said gate of said second synchronous rectifier;

wherein switching transitions of said first and second synchronous rectifiers are initiated by a polarity reversal of the voltage of said secondary transformer winding.

21. The circuit of claim 20 further comprising:

a first inductor coupled in series between said first terminal of said secondary winding and an output voltage terminal;

a capacitor coupled across said output voltage terminal and a voltage return terminal;

a second inductor coupled between said source of said second synchronous rectifier and said source of said first terminal of said secondary winding; and a third inductor coupled between said second terminal of said secondary winding and said source of said first synchronous rectifier.

22. The circuit of claim 20 further comprising:

a third switch coupled to said first synchronous rectifier, said second switch being coupled to said third switch; and a fourth switch coupled to said second synchronous rectifier, said first switch coupled to said fourth switch.

23. The circuit of claim 22 further comprising a first voltage limiter coupled to said first synchronous rectifier, a gate of said first voltage limiter coupled to a voltage source, and a second voltage limiter coupled to said second synchronous rectifier, a gate of said second voltage limiter coupled to a voltage source, wherein said fifth and second voltage limiters provide gate voltage limiting.

24. A method of rectifying a varying voltage from a power converter using a self-driven synchronous rectifier circuit with a transformer having a primary winding and a secondary winding, said secondary winding having a first and second terminal, said method comprising the steps of:

providing the varying signal to said primary winding of said transformer;

a first synchronous rectifier conducting current via a second terminal of said second winding;

a first switch controlling said first synchronous rectifier;

a second synchronous rectifier conducting current via said first terminal of said second winding;

a second switch controlling said second synchronous rectifier;

wherein said first and second switches are connected to said first synchronous rectifier and said second synchronous rectifier, respectively, such that switching transitions of said first and second synchronous rectifiers are initiated by a polarity reversal of the voltage of said secondary transformer winding.

25. The method of claim 24 wherein said first and second synchronous rectifiers and said first and second switches comprise MOSFET's, wherein the gate of said first synchronous rectifier is controlled by said first switch, and wherein the gate of said second synchronous rectifier is controlled by said second switch.

26. The method of claim 24 wherein said secondary winding comprises a center tap, said center tap coupled to an output voltage terminal by a first inductor, said method further comprising the steps of:

a third switch controlling said first synchronous rectifier; and a fourth switch controlling said second synchronous rectifier.

27. The method of claim 26 further comprising the steps of:

a first voltage limiter controlling said first synchronous rectifier; and a second voltage limiter controlling said second synchronous rectifier.

28. The method of claim 24 further comprising the steps of;

controlling multi-pulsing with a second inductor; and controlling multi-pulsing with a third inductor.

29. The method of claim 27 further comprising the steps of;

limiting the current with a first current-limiting resistor;

and limiting said current of with a second current-limiting resistor.

* * * * *